(12) United States Patent
Dellinger et al.

(10) Patent No.: US 10,317,552 B2
(45) Date of Patent: Jun. 11, 2019

(54) SEISMIC ACQUISITION USING NARROWBAND SEISMIC SOURCES

(71) Applicants: Joseph A. Dellinger, Houston, TX (US); John T. Etgen, Houston, TX (US); Graham Openshaw, Portsmouth, NH (US)

(72) Inventors: Joseph A. Dellinger, Houston, TX (US); John T. Etgen, Houston, TX (US); Graham Openshaw, Portsmouth, NH (US)

(73) Assignee: BP Corporation, North America Inc., Houston, TX (US)

( * ) Notice: Subject to any disclaimer, the term of this patent is extended or adjusted under 35 U.S.C. 154(b) by 358 days.

(21) Appl. No.: 14/820,048

(22) Filed: Aug. 6, 2015

(65) Prior Publication Data

US 2015/0346368 A1   Dec. 3, 2015

Related U.S. Application Data

(63) Continuation of application No. 13/327,524, filed on Dec. 15, 2011, now Pat. No. 9,134,442.

(60) Provisional application No. 61/423,962, filed on Dec. 16, 2010.

(51) Int. Cl.
*G01V 1/00* (2006.01)
*G01V 1/34* (2006.01)

(52) U.S. Cl.
CPC ............ *G01V 1/345* (2013.01); *G01V 1/005* (2013.01); *G01V 2210/6222* (2013.01); *G01V 2210/74* (2013.01)

(58) Field of Classification Search
CPC .............. G01V 1/005; G01V 2210/20; G01V 2210/40; G01V 2210/46; G01V 2210/47; G01V 2210/48; G01V 2210/42
See application file for complete search history.

(56) References Cited

U.S. PATENT DOCUMENTS

| | | | | | |
|---|---|---|---|---|---|
| 2,620,890 | A | * | 12/1952 | Lee | G01V 1/32 346/33 C |
| 3,697,937 | A | * | 10/1972 | Ingram | G01V 1/44 367/25 |
| 4,210,968 | A | * | 7/1980 | Lindseth | G01V 1/303 367/46 |
| 4,843,597 | A | * | 6/1989 | Gjessing | G01V 1/3808 342/22 |
| 4,885,726 | A | * | 12/1989 | Myers | G01V 1/005 181/120 |

(Continued)

FOREIGN PATENT DOCUMENTS

WO   2010/037840   4/2010

OTHER PUBLICATIONS

Wei, Analysis of vibrator performance at low frequencies, First Break vol. 29, Jul. 2011, pp. 55-61.*

(Continued)

*Primary Examiner* — Hovhannes Baghdasaryan
(74) *Attorney, Agent, or Firm* — Robert Hsiao

(57) ABSTRACT

There is provided herein a system and method of seismic data collection for land and marine data that utilizes narrowband to monochromatic low-frequency non-impulsive sources designed to optimize the ability of migration/inversion algorithms to image the subsurface of the Earth, in particular, full-waveform inversion.

19 Claims, 4 Drawing Sheets

(56) References Cited

U.S. PATENT DOCUMENTS

| | | | |
|---|---|---|---|
| 4,921,068 A * | 5/1990 | Pascouet | G01V 1/387 181/115 |
| 4,976,333 A * | 12/1990 | Pascouet | G01V 1/387 181/115 |
| 5,077,697 A * | 12/1991 | Chang | G01V 1/44 367/31 |
| 5,148,406 A * | 9/1992 | Brink | G01V 1/28 367/20 |
| 5,281,773 A * | 1/1994 | Duren | G01V 1/006 181/111 |
| 5,721,710 A * | 2/1998 | Sallas | G01V 1/375 367/38 |
| 6,714,867 B2 | 3/2004 | Meunier | |
| 7,257,049 B1 * | 8/2007 | Laws | G01V 1/006 181/113 |
| 7,382,684 B2 * | 6/2008 | Love | G01V 1/005 181/106 |
| 7,656,747 B2 * | 2/2010 | Mandal | G01N 29/11 181/105 |
| 8,467,266 B2 | 6/2013 | Love et al. | |
| 2002/0191490 A1 * | 12/2002 | Meunier | G01V 1/006 367/140 |
| 2003/0210609 A1 * | 11/2003 | Jeffryes | G01V 1/005 367/14 |
| 2004/0117123 A1 * | 6/2004 | Jing | G01V 1/28 702/16 |
| 2007/0195644 A1 * | 8/2007 | Marples | G01V 1/005 367/39 |
| 2010/0027376 A1 * | 2/2010 | Washbourne | G01V 1/28 367/25 |
| 2010/0110831 A1 * | 5/2010 | Love | G01V 1/005 367/32 |
| 2010/0118647 A1 * | 5/2010 | Tenghamn | G01V 1/005 367/24 |
| 2010/0232260 A1 * | 9/2010 | Zowarka | G01V 1/005 367/189 |
| 2011/0134722 A1 * | 6/2011 | Virgilio | G01V 1/30 367/75 |
| 2011/0255371 A1 * | 10/2011 | Jing | G01V 1/28 367/73 |

OTHER PUBLICATIONS

Ozdogan Yilmaz "Seismic Data Processing", Society of Exploration of Geophysicists, 1987, Chapter 1, pp. 9-81, Tulsa, Oklahoma, USA.

Ozdogan Yilmaz, "Seismic Data Processing", Society of Exploration of Geophysicists, 1987, Chapter 6, pp. 384-427, Tulsa, Oklahoma, USA.

Jack Bouska, "Distance Separated Simultaneous Sweeping: Efficient 3D Vibroseis Acquisition in Oman", BP Oman, SEG Houston 2009 International Exposition and Annual Meeting, 5 Pages.

Laurent Sirgue et al., "Full Waveform Inversion: The Next Leap Forward in Imaging at Valhall", First Break, vol. 28, pp. 65-70, Apr. 2010, EAGE www.firstbreak.org.

Puryear, et al., "An Algorithm for Calculation of Bed Thickness and Reflection Coefficients From Amplitude Spectrum", 2006, pp. 1767-1770, Publisher: SEG Technical Program Expanded Abstracts, Published in: US.

Puryear, et al., "Comparison of Frequency Attributes From CWT and MPD Spectral Decompositions of a Complex Turbidite Channel Model", 2008, pp. 393-397, Publisher: SEG Technical Program Expanded Abstracts 2008, Published in: US.

Puryear, et al., "Constrained Least-Squares Spectral Analysis: Application to Seismic Data", 2012, pp. 1-5, Publisher: SEG Technical Program Expanded Abstracts 2012, Published in: US.

Puryear, et al., "Layer-Thickness Determination and Stratigraphic Interpretation Using Spectral Inversion: Theory and Application", Mar.-Apr. 2008, Published in: US.

Laurent Sirgue and R. Gerhard Pratt, "Efficient Waveform Inversion and Imaging: A Strategy for Selecting Temporal Frequencies", Geophysics, vol. 69, No. 1, Jan.-Feb. 2004, pp. 231-248.

\* cited by examiner

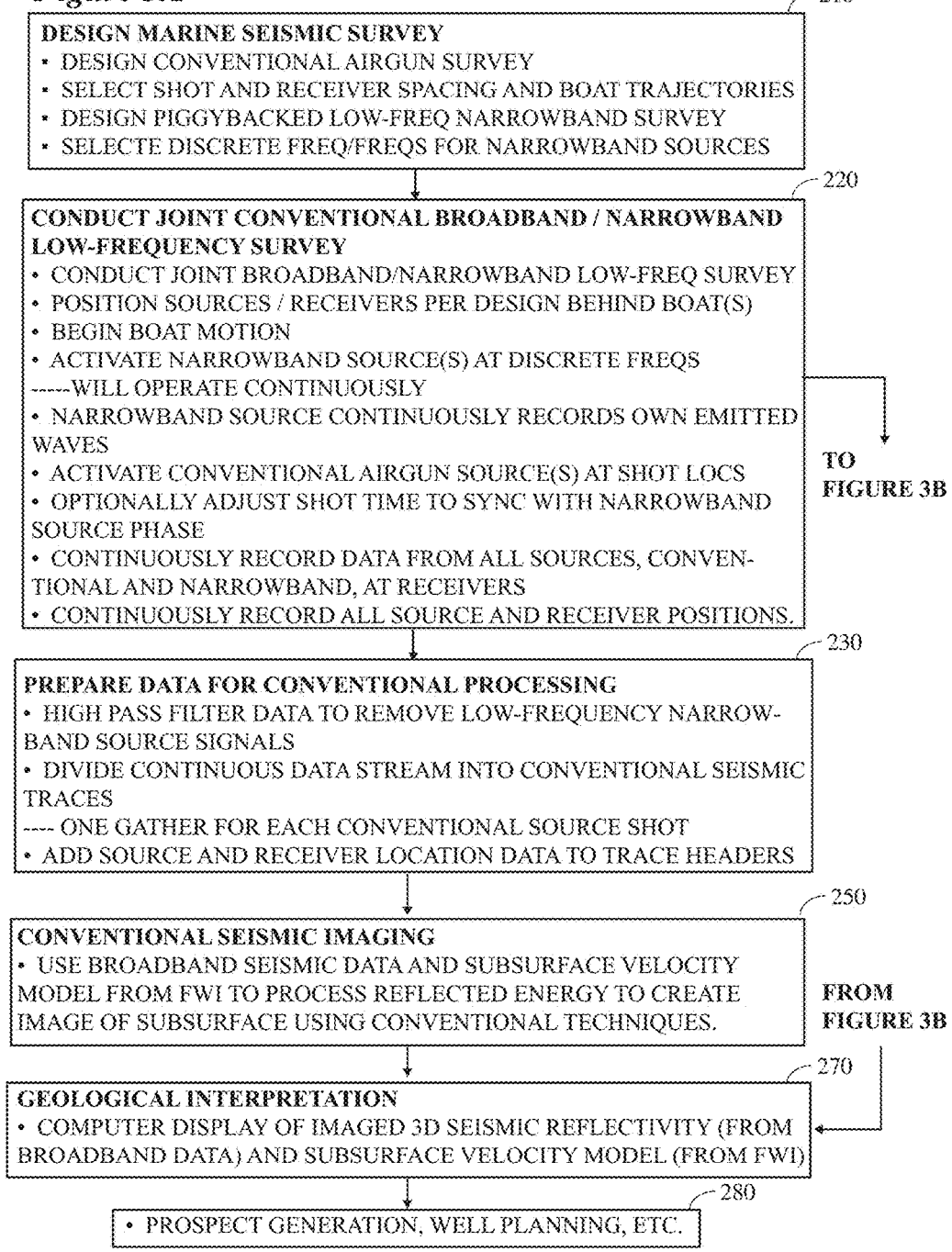

SEISMIC ACQUISITION USING NARROWBAND SEISMIC SOURCES

RELATED CASE

This application claims the benefit of U.S. Provisional Patent Application Ser. No. 61/423,962 filed on Dec. 16, 2010, and incorporates said provisional application by reference into this disclosure as if fully set out at this point. This application is also a continuation of U.S. application Ser. No. 13/327,524 filed Dec. 15, 2011, now allowed, and claims the benefit of and incorporates said application by reference into this disclosure as if fully set forth herein verbatim.

TECHNICAL FIELD

This invention relates to the general subject of seismic exploration and, in particular, to methods for acquiring seismic signals that are representative of the subsurface for purposes of frequency-domain waveform inversion.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic (sound wave) signal that travels downward through the earth, is reflected, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, both 2-D and 3-D surveys interrogate some volume of earth lying beneath the area covered by the survey, and processing of the recorded data is then implemented to produce an interpretable image. Finally, a 4-D (or time-lapse) survey is one that is taken over the same subsurface target at two or more different times. This might be done for many reasons but often it is done to measure changes in subsurface reflectivity over time which might be caused by, for example, the progress of a water flood, movement of a gas/oil or oil/water contact, etc. Obviously, if successive images of the subsurface are compared any changes that are observed (assuming differences in the source signature, receivers, recorders, ambient noise conditions, etc., are accounted for) will be attributable to the progress of the subsurface processes that are at work.

A conventional seismic survey is composed of a very large number of individual seismic recordings or traces. These are typically 10 to 20 seconds long, to allow enough time for the echoes of interest to return before the source is fired again. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A conventional seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location associated with every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

Conventional seismic acquisition and processing have advanced considerably over the previous decades, but the fundamental paradigm described above of recording "echoes" and using the timing of these to locate discontinuities in the Earth has remained essentially unchanged. Full-Waveform Inversion (FWI) is a time or frequency-based seismic processing technique that provides a more general paradigm for imaging subsurface structures: instead of relying solely on reflected or scattered waves echoing off of geological discontinuities in the Earth, FWI also makes use of transmitted/refracted waves that travel downwards, then turn to become horizontal, and finally turn upwards to emerge as upgoing seismic waves (possibly at a considerable distance from their origin). Subsurface structures in the Earth advance, retard, and/or distort these transmitted/refracted diving waves by their presence, and FWI solves for their location and properties from the characteristic imprints these leave in the data. See, for example, the teachings of Sirgue, et. al, in U.S. patent application Ser. No. 11/756,384, filed May 31, 2007, the disclosure of which is fully incorporated herein by reference as if set out at this point. FWI has recently moved from being an academic curiosity to finding widespread industrial application. See, for example, Sirgue, et. al, 2010, *Full waveform inversion: the next leap forward in imaging at Valhall*, First Break volume 28, page 65, the disclosure of which is fully incorporated herein by reference as if set out at this point.

Frequency-domain algorithms, in particular the FWI algorithm mentioned above, require input seismic data that are very different from what is conventionally recorded: they work on monochromatic wavefields. Conventional seismic data must be converted into a form these algorithms can use, by Fourier transformation from time to frequency domain (with appropriate windowing and tapering), after which individual frequencies are picked out for use. Sirgue's frequency-domain FWI algorithm detects subsurface structures by the perturbations they create in the amplitude and phase of these monochromatic wavefields.

Note the fundamental shift in paradigm here: instead of an impulsive source followed by listening for (recording) discrete returning echoes, mathematically for purposes of understanding the FWI algorithm the source may now be considered to be a continuous pure tone (i.e., a monochromatic source) exciting standing waves in the Earth. Unknown subsurface structures are detected by analyzing how the amplitude and phase of these standing waves differ from what was expected. By making use of transmitted/refracted diving waves, FWI can detect structures that do not generate a classic impulsive "echo".

Thus, current practices when performing frequency-domain FWI on land vibrator (vibration) data are unnecessarily roundabout: seismic waves are generated using a swept-frequency source, the reflected/refracted waves are detected with a receiver, and the resulting data are then processed to approximate data from a traditional impulsive source. The "impulsive" seismic data are then processed to look like data from a monochromatic source, as needed by the frequency-domain inversion algorithms.

In fact, it has been shown that frequency-domain FWI only requires a small number of well-separated discrete frequencies in order to produce a good result. See, for example, Sirgue, L., and Pratt, R. G., 2004, *Efficient waveform inversion and imaging: A strategy for selecting temporal frequencies*, Geophysics volume 69, page 231, the disclosure of which is fully incorporated herein by reference as if set out at this point. Thus, with conventional acquisition followed by frequency-domain FWI, much of the energy produced by traditional broadband sources is wasted: it is at frequencies that are not used by the processing algorithm.

Note that, without low-frequency wide-offset data which contain the transmitted/refracted waves discussed above, full-waveform inversion often fails and may not resolve the subsurface structures (i.e. can produce a useless result). Unfortunately, traditional seismic sources do not provide the low-frequency waves that would generally be desired and, more particularly, the low-frequency data that may be used when full-waveform inversion is performed.

In particular, the most popular impulsive sources, dynamite on land or airguns offshore, produce relatively little low-frequency energy. The conventional way to provide more low-frequency energy for a seismic survey is to produce more energy at all frequencies, which is often impractical for cost, safety, and engineering considerations. Swept-frequency sources such as vibrators allow for more control of the frequencies of the emitted acoustic waves, and so may provide a more promising method for generating low-frequency waves.

Currently the practice for land vibrators is to generate a broadband sweep. The emitted vibrator source "chirp" is then correlated with the recorded seismic data to produce data traces that approximate those generated by an impulsive seismic source. Unfortunately, creating a reliable, high-output, broadband swept-frequency land vibrator has proven to be a challenge for low-frequency waves below about 3 Hz. Various solutions have been proposed, of which the most straightforward is to use a massive vibrator and to drive it with a nonlinear sweep such that the vibrator spends more time producing the lowest frequencies. See, for example, Baeten, in WO Patent Application 2010/037840 A1, filed Oct. 2, 2009, the disclosure of which is fully incorporated herein by reference as if set out at this point.

The situation is similar offshore. For swept-frequency marine sources (marine vibrators, resonators, water sirens, etc.) conventional practice is to generate a relatively broadband sweep. The emitted source "chirp" is then correlated with the recorded seismic data to produce a seismic trace that is conceptually equivalent to one generated by an impulsive seismic source such as an airgun (but without the airgun's production of seismic energy at frequencies above about 100 Hz that are not used for seismic imaging). Creating a reliable, high-output, broadband swept-frequency source for marine use has proven to be a challenge, particularly for frequencies lower than those that conventional airguns can generate (e.g. frequencies of about 4 Hz or less).

Thus, if the goal is to acquire data associated with low-frequency reflected/refracted waves for frequency-domain FWI or other uses, current industry practice has several disadvantages. As was discussed above, frequency-domain FWI performed on conventionally acquired broadband seismic data discards much of the generated data, and much of the energy produced by the source is thus wasted (whether from an impulsive or a swept-frequency source), which is obviously inefficient.

Potentially more troublesome, use of impulsive broadband sources introduces approximations that may degrade the final result. Frequency-domain full-waveform inversion uses a theory based on monochromatic standing-wave patterns. Frequency-domain FWI algorithms such as those discussed supra achieve computational practicality by approximating these source-excited wavefields using tapered monochromatic sine-wave sources modeled in the time domain. The resulting data are then discrete-Fourier-transformed and a single frequency extracted. The recorded broadband field data are similarly discrete-Fourier-transformed and the same single frequency extracted. The inversion process then attempts to find an Earth model that best matches the amplitude and/or phase of the modeled monochromatic data with the amplitude and/or phase derived from the recorded impulsive broadband data for that frequency. The tapered-monochromatic sources used in computer modeling typically have a very different signature than the broadband sources used in the field. This introduces an approximation, which is only partly ameliorated by the step of Fourier-transforming both the real and modeled data and extracting the same single frequency.

The goal of an inversion algorithm is to produce a computer model of subsurface structures that correctly predicts the subsurface structures of interest in the real Earth. Logically, the better the computer modeling of how the waves are generated, recorded, and processed matches what happened in the real Earth, the better the result of the inversion algorithm can be. To produce a better inversion result, it is desirable to match the acquisition and processing of the seismic data and the computational modeling in the computer as closely as practicable. This can be achieved by modifying the computer modeling to better match what happened in the real Earth. It could also be achieved by modifying the acquisition and processing of the field data to match the computer modeling.

Finally, in addition to all these shortcomings of existing practice, conventional seismic sources often do not produce sufficient energy over the time duration of a conventional seismic trace to generate low-frequency transmitted/refracted diving waves recordable at the very wide offsets desirable for full-waveform inversion.

Typically, the trace lengths used in existing seismic surveys are based on the limitations of a conventional imaging paradigm that frequency-domain FWI does not use. Without being limited by theory, the monochromatic standing waves used by a frequency-domain algorithm repeat endlessly.

Data generated by a monochromatic source do not have a natural maximum recording length beyond which no further useful data can be received. Accordingly, the signal-to-noise ratio may be increased by obtaining signals over a longer duration by allowing the sources to radiate for longer time periods.

Existing methods for using very long sweeps to generate more energy from low-amplitude sources require sources with precisely controllable emitted waveforms. See for example Meunier, U.S. Pat. No. 6,714,867 B2, filed Feb. 9, 2001, the disclosure of which is fully incorporated herein by reference as if set out at this point. Such control can be difficult to achieve in practice, especially at low frequencies.

Heretofore, as is well known in the seismic acquisition and processing arts, there has been a need for a system and method of efficiently acquiring low-frequency data optimized for use with inversion algorithms, particularly frequency-domain full-waveform inversion. Accordingly, it should now be recognized, as was recognized by the present inventors, that there exists, and has existed for some time, a very real need for a method of seismic data acquisition and processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims. In particular, the acquisition methodology may prove useful for obtaining low frequencies for other algorithms besides frequency-domain full-waveform inversion, for example, time-domain full-waveform inversion.

SUMMARY OF THE INVENTION

According to a preferred aspect of the instant invention, there is provided a system and method for acquiring additional data beyond that normally acquired in a seismic survey for purposes of improving the processing thereof.

According to a first preferred embodiment, one or more monochromatic or narrowband low-frequency "sweeps" will be acquired using a tunable, controlled frequency or otherwise customizable seismic source (e.g., a land vibrator that can configured to produce a signal that is largely confined to a single target frequency, or within a narrow frequency range), with the series of frequencies or narrow frequency ranges selected having been chosen to improve the calculation of a full-waveform inversion. In this way a methodology for the acoustic waves emitted by the source is used in the field that matches the methodology used in the processing algorithm in the computer. Typically the frequencies used would be lower than those that can be feasibly acquired using conventional broadband seismic sources (i.e., below about 4 Hz).

The source(s) will emit the monochromatic waves for at least a time period sufficient to achieve a target signal-to-noise ratio for signals recorded at the desired maximum recording offsets that are used for full-waveform inversion of the desired target subsurface structures. Recorded data trace lengths should be long enough to accommodate the longest emission times, or alternatively, recording should be continuous.

Note that the instant invention does not require a monochromatic source to precisely maintain a particular source frequency. As a rough rule of thumb, if the length of time sufficient to build up a sufficient signal-to-noise ratio is T, then a source that maintains a frequency accuracy of about ±1/T Hz is for all practical purposes still monochromatic. A small frequency drift can often be well approximated as a phase shift of a monochromatic source. Conventional practice is for frequency-domain full-waveform inversion algorithms to solve for the unknown source phase, so this presents no additional algorithmic complication. Accordingly, relatively minor deviations from the target frequency are not deleterious to the operation of the instant invention.

A narrowband source that emits energy over a bandwidth wider than ±1/T Hz, but still less than the two or more octaves of a typical broadband source, may also be useful for some applications, for example time-domain full-waveform inversion. The signal-to-noise ratio depends on both the strength of the signal and the strength of the noise. Natural background noise is typically broadband, so the narrower the bandwidth of the signal, the less background noise that falls within its bandwidth, and thus the less signal energy and the shorter the signal integration time sufficient to achieve the desired signal-to-noise ratio. Monochromatic sources are merely a limiting case of the broader category of narrowband sources.

A stepped-frequency source is monochromatic for time periods of "T" (the time period to build up the signal-to-noise ratio) or more seconds, at which point it changes to a new frequency, which it also maintains for "T" or more seconds before changing again, and so on, eventually returning to the original frequency and beginning the cycle again. Instead of changing frequencies abruptly, the source may taper down its amplitude and cease emitting, then taper up in amplitude at the new frequency, or it may "sweep" from one monochromatic frequency to the other over a time period substantially shorter than "T".

The waves emitted by the monochromatic or narrowband source may be monitored and recorded continuously. The resulting data will be used to create an optimal source wave field in the modeling step of the inversion algorithm used to process the data. That is, instead of precisely controlling the amplitude, frequency, and phase of the waves emitted by the source(s) in an attempt to mimic in the field an idealized source assumed by the standard processing algorithms, the amplitude, frequency, and phase of the waves emitted by the source(s) are recorded and the model source(s) in the algorithm are adjusted to match these. The location of each source as it radiates must also be recorded so that this information can also be used in the modeling.

In practice, low-frequency narrowband, monochromatic or stepped-frequency land vibrators would be used to supplement, not replace, the existing higher-frequency broadband ones. The low-frequency and conventional high-frequency surveys can be acquired either separately or concurrently.

According to another preferred embodiment, there is provided an invention substantially the same as that described above, but wherein marine seismic data are recorded. The narrowband, monochromatic, or stepped-frequency sources may radiate continuously as they are towed through the water, so as to maximize the amount of energy produced. The emitted source waves, the received reflected/refracted waves and the source and receiver positions may also all be recorded continuously. In this case the modeling step of the full-waveform inversion algorithm (either time-domain or frequency-domain) may include a moving source, mimicking the motion of the actual source.

Of course, acquiring auxiliary information of this sort has the potential to significantly improve the quality of the subsurface images produced by processing the seismic data which, in turn, would improve the chances of discovering economic quantities of oil and/or gas.

In some embodiments a low-frequency survey will be used to improve a previously acquired model of the subsurface derived from conventional broadband higher-frequency data.

According to another aspect of the instant invention, there is provided a method of seismic exploration above a region of the subsurface containing structural or stratigraphic features conducive to the presence, migration, or accumulation of hydrocarbons, comprising the steps of: selecting at least one narrowband frequency range; providing at least one narrowband seismic source for each of said selected at least one narrowband frequency range, each of said narrowband seismic source emitting seismic energy at least approximately within a corresponding narrowband frequency range; conducting a narrowband seismic survey using each of said at least one narrowband seismic source, thereby creating a narrowband seismic survey; combining at least a portion of said narrowband seismic survey together with a broadband survey collected proximate to said narrowband seismic survey, thereby forming an enhanced survey; and, using at least a portion of said enhanced survey to explore for hydrocarbons within said region of the subsurface.

In another embodiment there is provided a method of seismic exploration above a region of the subsurface containing structural or stratigraphic features conducive to the presence, migration, or accumulation of hydrocarbons, comprising the steps of: selecting at least one discrete frequency; providing at least one monochromatic seismic source for each of said selected at least one discrete frequency, each of said narrowband seismic source emitting seismic energy at a frequency at least approximately equal to said corresponding discrete frequency; conducting a narrowband seismic survey using each of said at least one monochromatic seismic source, thereby creating a narrowband seismic survey; combining at least a portion of said narrowband seismic survey together with a broadband survey collected proximate to said narrowband seismic survey, thereby forming an enhanced survey; and, using at least a portion of said enhanced survey to explore for hydrocarbons within said region of the subsurface.

In other embodiments, the conventional broadband and low frequency narrowband seismic surveys will be continuously recorded by some of the same receivers, and the higher-frequency broadband, low frequency narrowband, and ambient noise signals recorded by these receivers will be separated before further processing.

In still other embodiments, the timing of shots in the higher-frequency broadband survey will be adjusted according to the phase of the highest-frequency narrowband source in the low-frequency survey so as to mitigate crosstalk between the two surveys.

In still further embodiments, the emitted wavefields of the one or more narrowband low-frequency source(s) will be recorded and that information will be used to improve the processing of the narrowband seismic data.

In still another embodiment, only the phase and amplitude of the near-monochromatic narrowband low-frequency source(s) will be recorded.

In still another embodiment, there is provided a method of seismic exploration above a region of the subsurface containing structural or stratigraphic features conducive to the presence, migration, or accumulation of hydrocarbons, comprising the steps of selecting a plurality of discrete frequencies; providing at least one monochromatic seismic source corresponding to each of said selected plurality of discrete frequencies, each of said at least one monochromatic seismic source emitting seismic energy at a frequency at least approximately equal to said corresponding discrete frequency; conducting a narrowband seismic survey using each of said at least one monochromatic seismic source, thereby creating a narrowband seismic survey; using at least a portion of said narrowband seismic survey to calculate a full waveform inversion data set; and, using at least a portion of said full waveform inversion data set to explore for hydrocarbons within said region of the subsurface.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. In particular, other algorithms (besides frequency-domain full-waveform inversion) may benefit from supplementing existing broadband seismic data with low-frequency data generated by narrowband, monochromatic, or stepped-frequency sources. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIGS. 3A and 3B contain additional details of the steps in FIG. 2.

DETAILED DESCRIPTION

Figure 1:
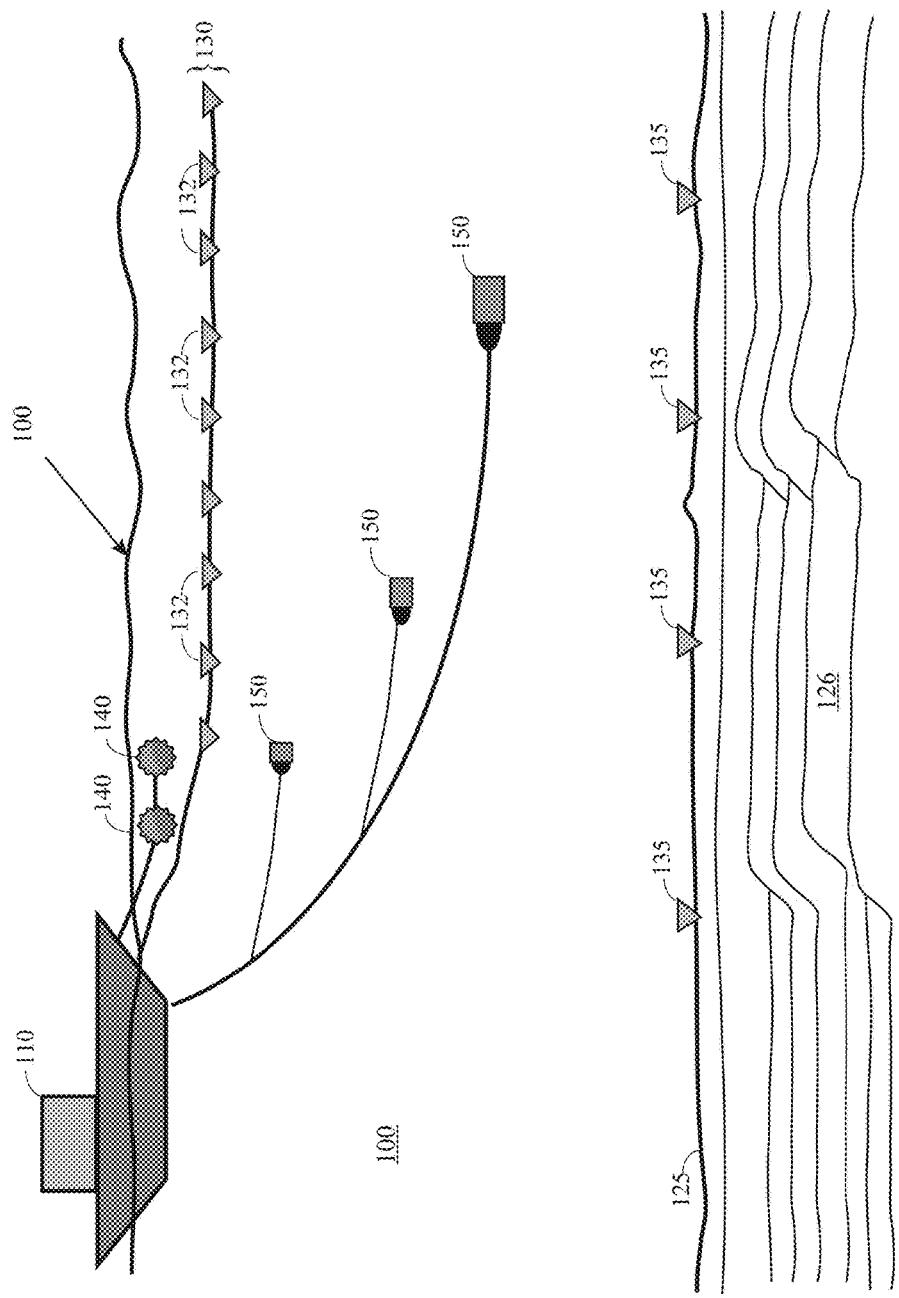
FIG. 1 illustrates an embodiment of a survey system for implementing the instant invention in a marine environment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Illustrative Example Embodiments of the Invention

FIG. 1 illustrates a marine acquisition geometry suitable for implementing the instant invention. In some embodiments, a seismic survey will be conducted in the ocean 100 over a subsurface target of geological interest 126 which lies beneath the seafloor 125. A boat 110 floating on the ocean surface 120 will tow a conventional airgun array 140 and a streamer 130 of receivers, e.g., hydrophones 132. These components comprise the "conventional broadband acquisition" portion of the survey system.

In the augmented survey system, the boat 110 may tow one or more low-frequency monochromatic or narrowband sources 150, each of which will contain a receiver or sensor (not shown) that will record the wavefield emitted by that source as is often done. To enhance the low-frequency recordings, ocean-bottom receivers 135 may simultaneously be deployed and used in conjunction with the conventional streamer 130, or ocean-bottom receivers 135 may be used without streamers 130. These comprise the "narrowband low-frequency" portion of one embodiment of the instant survey system.

The airguns 140 may be towed at shallow depths in order to enhance their ability to generate higher-frequency acoustic waves. The low-frequency sources 150 are shown towed at deeper depths; in some embodiments each will be towed at a depth appropriate for its frequency range. Thus, the lower the frequency of the monochromatic or narrowband source, the deeper the depth. See, for example, Tenghamn, U.S. patent application 2010/0118647 A1, filed Nov. 7, 2008, or Laws et al., U.S. Pat. No. 7,257,049 B1, filed Aug. 22, 2000, the disclosures of which are fully incorporated herein by reference as if set out at this point.

Note many variations of this acquisition system are possible and well within the ability of one of ordinary skill in the art to devise. The instant survey system could acquire 2-D, 3-D, or 4-D data. More than one airgun array could be used. The conventional sources might not be airguns, but might instead be any other broadband seismic source such as those of the types discussed above, that would benefit from low-frequency supplementation. More than one streamer of receivers could be used. One or more low-frequency sources could be used. Instead of one boat towing all of the components of the survey system, the components could be supported by multiple boats moving in choreographed formation. The low-frequency narrowband survey could be performed at the same time as the conventional higher-frequency broadband survey, or in a separate pass, or in multiple separate passes. Alternatively, a low-frequency narrowband survey could be used to supplement a previously acquired conventional higher-frequency broadband survey such that the original data is re-processed with the additional low-frequency data, or a low-frequency narrowband survey could be acquired first, and a conventional higher-frequency broadband survey later. The data could be recorded by streamers, by ocean-bottom receivers, or both, or possibly even by receivers in subsurface wells, or by receivers suspended in the water column.

The low-frequency sources 150 could operate continuously. The low-frequency sources could each operate at a single frequency ("monochromatic" low-frequency sources) or cycle between two or more discrete frequencies ("stepped-frequency" low-frequency sources), or sweep over a narrowband range of low frequencies designed to augment the frequency range produced by the broadband sources ("narrowband" low-frequency sources). The sources could operate to produce waves of constant amplitude, or the amplitude of the waves could vary (taper up and down).

Figure 2:
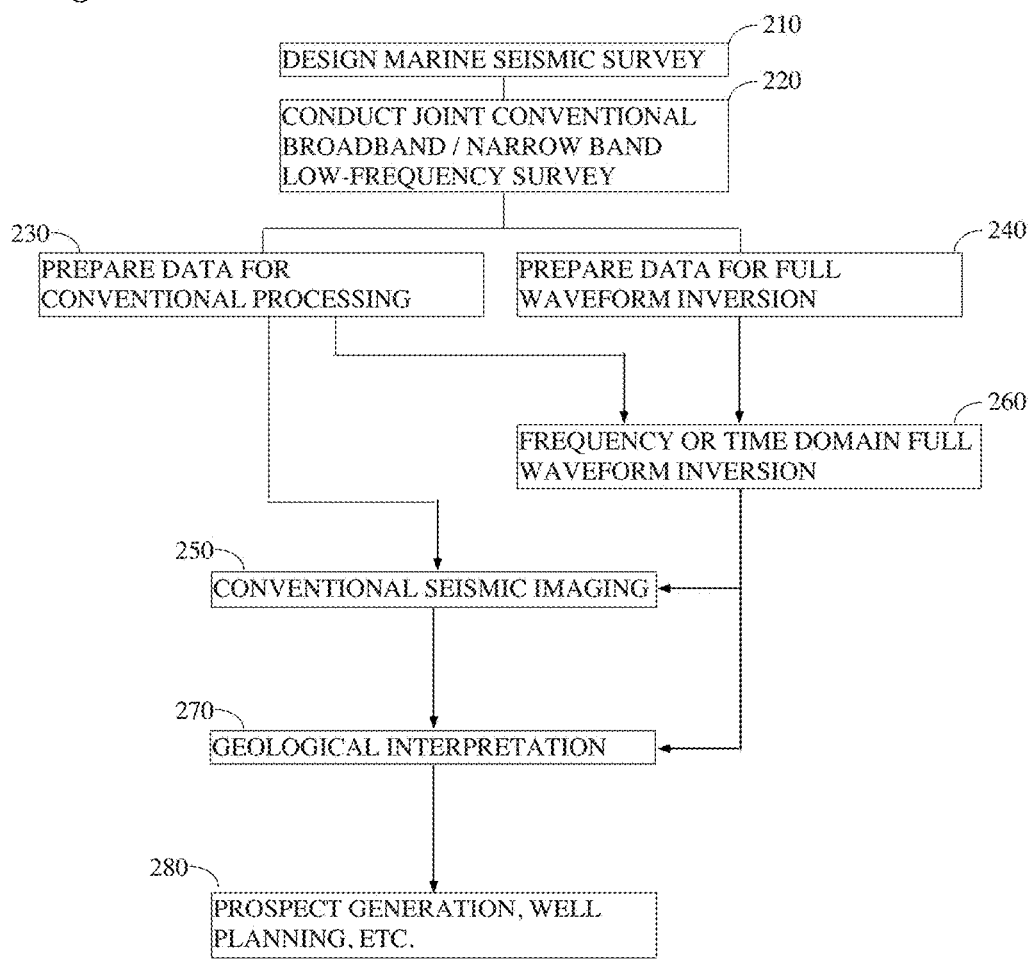
FIG. 2 contains a high-level summary of some steps of an embodiment of the instant invention that would be suitable for use with the marine survey method shown in FIG. 1.

FIG. 2 shows how the acquisition system shown in FIG. 1 might be used in practice. Initially, a seismic survey will be designed. Note that, for purposes of illustration only, the discussion that follows will be primarily directed toward the design of a marine survey. That being said, those of ordinary skill in the art will readily understand how the instant approach might be modified where the survey is to be taken on land.

As shown in FIG. 2, 210, a conventional airgun survey may be designed such that it is acquired together with a low-frequency survey. The principles of conventional survey design are well established and will not be discussed here. Note that the steps of FIG. 2 are explained in greater detail in FIGS. 3A and 3B.

For the low-frequency data, the survey design might proceed as follows. Typically, an airgun array design provides adequate data for emitted waves having a frequency of above 3.5 Hz, but computer modeling of applying waveform inversion in this geological setting suggests that frequencies as low as 1.4 Hz may be important to obtain a successful full-waveform inversion. The algorithm for selecting frequencies given in Sirgue, L., and Pratt, R. G., 2004, previously referenced, suggests frequencies should be selected that are separated by a ratio of about √2 for this survey geometry. Thus in the instant example, three or more narrowband sources may be used, operating at 1.4, 2.0, and 2.8 Hz., respectively. (In this example the next frequency would be 4 Hz, but that frequency will be available from the data collected using the broadband sources, so a narrowband source may not be used to acquire that frequency.)

A theoretically optimal ratio between successive frequencies can be shown to be equal to $$\frac{1}{\alpha_{min}} = \sqrt{1 + \left(\frac{o}{2d}\right)^2},$$

where o is the maximum offset and d is the depth of the target of interest. So, for example, consider a maximum offset of 20 kilometers and a target depth of interest of 6 kilometers. Then, $$\frac{1}{\alpha_{min}} = \sqrt{\frac{34}{9}} \approx 1.94$$

So, starting from 0.7 Hz and following the prescription identified above, the next frequency would be 1.36 Hz, followed by 2.64 Hz, followed by 5.14 Hz, etc. The last frequency is likely within the range available from conventional sources such as airguns, so in this case only 3 frequencies would be used to from a controlled-frequency source: 0.7, 1.36, and 2.64 Hz. In practice it might be desirable to be a bit conservative, but this example still illustrates that only a few frequencies may be needed for realistic examples.

It may further be desirable to choose to perturb the frequencies of the monochromatic sources to prevent unwanted interference of harmonics between the seismic sources. For example, if the theory suggests that sources emitting waves 1.0 and 2.0 Hz should be employed, it might be preferred instead to use 0.9 and 2.1 Hz, to avoid having one source frequency conflict with the second harmonic of the other. Optionally the harmonic or subharmonic output of a "monochromatic" source might be enhanced and use made of the harmonics or subharmonics as additional monochromatic sources. So, for example, one source might simultaneously generate waves having frequencies of 1.4 and 2.8 Hz.

Next, a joint survey 220 may be conducted, although the invention would operate similarly if separate broadband and narrowband surveys were conducted. The conventional survey may proceed as usual, with the airguns being fired as the airgun array passes over each desired shot point location. If the airguns emit waves with a detectable intensity at, for example, 2.8 Hz, the highest of the low-frequency sources, it might be desirable to slightly modify the timing of each shot so that the 2.8-Hz wave component of the airgun signal is timed to be in-phase with the waves produced by the 2.8 Hz monochromatic low-frequency source(s). Note at most this would require delaying or advancing the shot timing by 1.4 seconds. Alternatively, the boat speed could be adjusted so that the airguns reach their shot locations just at the desired point in the monochromatic source's cycling. Note the energy of the acoustic signal produced from airguns rapidly falls off at lower frequencies, so any unwanted interference will be much reduced for any lower low-frequency sources.

The narrowband low-frequency sources may operate independently or simultaneously. The narrowband low frequency sources may operate continuously or discontinuously. Each narrowband low-frequency source records the signal it is radiating, as this information will be used when performing the inversion.

The receivers could be recorded continuously. The locations of all sources and receivers will, in some embodiments, also be recorded continuously.

The recorded data will then typically be prepared for two uses: for conventional processing 230 and for full-waveform inversion 240. If the low-frequency sources are truly monochromatic, simple bandpass filtering may suffice to remove their reflected/refracted waves from the conventional dataset. If they generate harmonics that overlap into the frequency band of the broadband sources, a more sophisticated predict-and-subtract filtering algorithm (such as one designed to remove 60 Hz AC hum from land seismic data) may be used. It is observed that, by definition, low-frequency signals cycle slowly, and so may not be sampled over a sufficient number of cycles to be well represented on conventional-length traces. Thus, separation of the high-frequency and low-frequency datasets (along with any low-frequency environmental noise suppression) will likely be done before the data is divided into conventional-length traces. Further, in some instances the conventionally acquired data will be combined with the narrowband data to yield an enhanced seismic dataset with a range of frequencies that would not have been available if only the conventional survey had been utilized.

Once the data have been prepared, full-waveform inversion 260 may, in some embodiments, be performed first. This is typically done in stages starting from low frequencies and working towards higher and higher frequencies. Therefore, in this arrangement, data from the narrowband low-frequency sources will be processed first, beginning with the lowest frequency, followed by using the conventional broadband dataset for higher frequencies. For the low frequencies, the modeling portion of the FWI algorithm may use a source wavefield that matches the emitted waves recorded by each low-frequency source.

The FWI algorithm produces an improved velocity model of the Earth, which may be used to improve the velocity model used for conventional seismic imaging 250.

Geological interpretation 270 makes use of both the migrated image provided by conventional processing 250, and the velocity model provided by full-waveform inversion 260. These two sources of information can complement each other when performing geological interpretation.

Figure 3B:
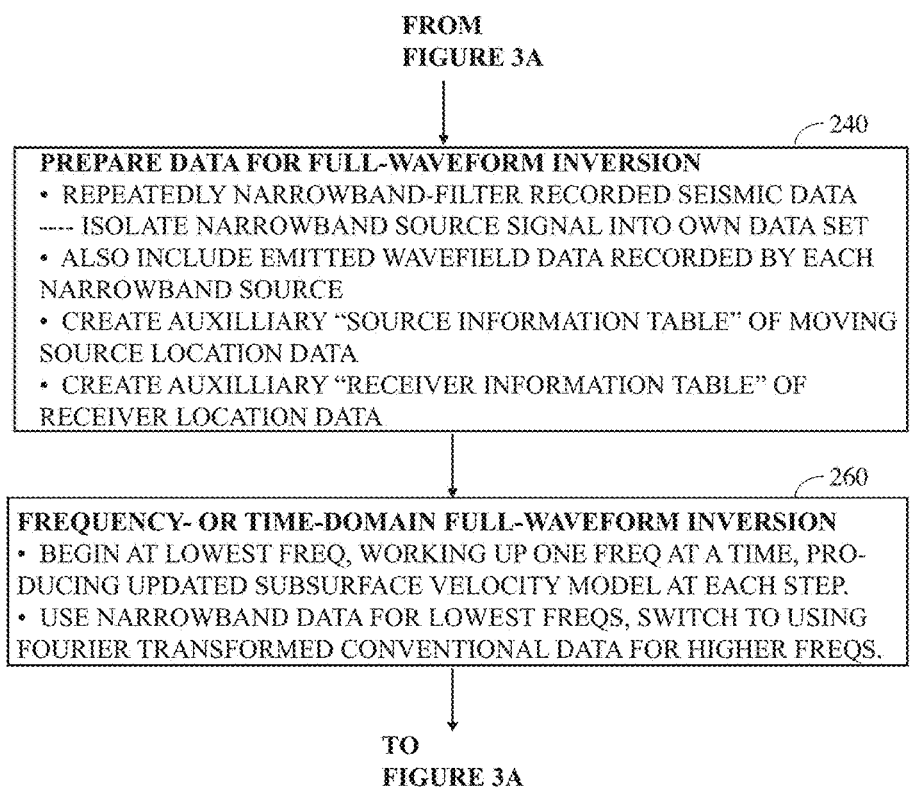

The geological interpretation 270 of the data might be performed on the processed data next according to methods well known in the seismic arts. Based on the outcome of the interpretation (and potentially combining data from other sources such as well logs, gravity, magnetics, etc.) in some cases prospect generation 280 and well planning will be undertaken according to methods well known to those of ordinary skill in the art. FIGS. 3A and 3B provide additional details of the steps of FIG. 2.

According to another embodiment, there is provided a method of acquiring a narrowband low-frequency seismic survey. Freed of the necessity to generate a wide range of frequencies, a specialized narrowband source can produce usable data at lower frequencies than have previously been possible. In particular, the simplest way to transmit more seismic energy into the ground and, hence, receive and record higher energy reflected/refracted waves and obtain additional seismic data is simply to emit signals or sweep for longer periods of time. A narrowband low-frequency source may emit signals or waves for any suitable time in order to achieve the signal-to-noise ratio.

Data from the survey may be recorded continuously, or as close to continuously as practicable. Traditionally source and receiver locations will typically be recorded in the trace headers. In the case of continuous data, this information should be maintained separately while recording. Any filtering/signal separation should be done on the continuous data, prior to any division of the data into fixed-length traces as may be called upon by some processing algorithms.

The frequency ranges of the narrowband low-frequency sources should be optimized to support the algorithm that will be used to process the data. In particular, if the application is low frequencies for frequency-domain full-waveform inversion, only a small number of discrete monochromatic frequencies may be used by the algorithm. This can be achieved by assigning one or more discrete frequencies to each narrowband source. If only one frequency is assigned to a source, it will be considered to be a monochromatic or monotone source for purposes of the instant disclosure. If two or more discrete frequencies are assigned to a source, it may step between them, or it may produce the frequencies simultaneously, or both strategies may be used in combination.

Frequency-domain full-waveform inversion of the sort that would be suitable for use with the instant invention iteratively performs a modeling step followed by an inversion/update step. The conventional intermediate step of correlating the recorded data to appear as if it were acquired using an impulsive source would tend to be counterproductive in this case. The algorithm conventionally employed in frequency-domain full-waveform inversion works on standing waves generated by monochromatic sources, not traveling waves generated by an impulsive source. Best results should be achieved when the survey methodology and the modeling step of the algorithm correspond as closely as possible. Thus, if the algorithm requires monochromatic sources, the source(s) in the field should perform likewise.

When it is not practical to match the survey methodology to the processing algorithm, the processing algorithm should be matched to the survey methodology as nearly as possible. In particular, it may be difficult to control the precise waveform of the acoustic signal emitted by a low-frequency narrowband source. In that case, the acoustic signal radiated by each low-frequency narrowband source should be measured, and this information used to inform the modeling step of the processing algorithm. In the case of a monochromatic source, it may suffice to only measure the amplitude and phase of the emitted waves.

If moving sources are used in the field, the modeling step of the processing algorithm should also model moving sources.

If the application is instead low frequencies for time-domain full-waveform inversion, instead of discrete frequencies a long-duration sweep over a narrowband frequency range may be used, for example a sweep from 1.0 to 2.0 Hertz over 40 seconds of time. Again, the acoustic signal radiated by each low-frequency narrowband source should be measured, and this information used to inform the modeling step of the processing algorithm.

Two or more narrowband low-frequency sources that have non-overlapping frequency bands may be operated simultaneously without regard to each other, as their signals can easily be separated by bandpass filtering. In particular, different sources may each have their own shot grid and schedule optimized to the sampling requirements for that frequency band.

If a goal is to create a velocity model, a small number of low frequencies may be sufficient and higher frequencies (e.g., from a conventional/broadband survey) may not be used. In this case a narrowband low-frequency survey could be usefully performed without an accompanying higher-frequency broadband survey. If higher frequencies that would be better obtained by conventional broadband sources will also be desired, the narrowband low-frequency survey may be designed to augment the bandwidth (frequency range) of the conventional seismic survey at the lower-frequency end of the bandwidth. In this case, the narrowband low-frequency survey then supplements the conventional survey; it does not replace it. The conventional broadband survey and the low-frequency narrowband survey may use the same receivers as far as practicable.

If the narrowband low frequency sources operate at frequencies below those that conventional broadband sources generate, then the narrowband low-frequency and conventional broadband surveys can be performed without regard to each other. As used herein, "low frequency" may refer to a frequency or range of frequencies below about 6-8 Hz. As such, low-frequency sources are sources that are capable of emitting seismic energy at a usable amplitude at frequencies below about 6-8 Hz. Furthermore, "low-frequency narrowband seismic survey" may refer to surveys utilizing low-frequency narrowband sources.

If a single narrowband source operates at a frequency that lies within the range of an impulsive broadband source, then the broadband source may be located proximate to the narrowband source, and the timing of the impulsive broadband source synchronized with the operating narrowband source such that the phase of the corresponding frequency component of the broadband source matches as closely as possible the phase of the narrowband source. In this way interference from the broadband sources will not cause harm, but will serve as an additional useful source of low-frequency energy.

Harmonic waves from the narrowband sources may overlap the frequencies of the waves produced by conventional broadband sources. In that case, the timing of the shots in the conventional survey and the narrowband emissions in the low-frequency survey should be chosen such that the conventional shots avoid overlapping the taper at the start or end of any narrowband sweep. Any crosstalk will then likely consist of a very simple repeating signal that can easily be predicted and removed, in a manner that is analogous to the way that 50 or 60 Hz AC hum is currently removed from land data.

Some additional considerations apply specifically to a land embodiment. Land sources, such as vibrators, are operated at fixed locations, so the sources cannot operate continuously. Each low frequency suited or optimal for the processing algorithm will likely be obtained by generating a tapered monochromatic or narrowband vibrator sweep at a source density tailored for that frequency range. Very long sweeps obviously take longer, but they can still be practically utilized because far fewer source points are used to adequately sample the Earth at low frequencies (and this advantage is squared because it applies in both the X and Y directions).

Monochromatic sources, like impulsive sources, will generate undesirable surface waves ("ground roll") on land. For monochromatic sources these cannot generally be completely removed by muting, due, among other reasons, to the sources' extended signature. Thus, they may be removed by spatial filtering. This sets a minimum source and/or receiver group and/or array spacing to avoid aliasing of the surface waves.

Some additional considerations apply specifically to a marine embodiment. Marine sources are generally towed behind a seismic acquisition vessel. Each source may be towed at its optimal depth to take full advantage of the surface ghost anti-notch. To achieve maximal signal-to-noise ratio, the sources may operate continuously, and data may be recorded continuously.

To generate data for the sources at the desired locations, data from a time window centered about the time when the source was at the desired location will typically be windowed out and a taper such as a raised-cosine taper applied to minimize any edge effects due to the time windowing, ideally using the same window length and taper as are computationally used in the modeling step of the inversion algorithm. The modeling step of the inversion algorithm should also model data from a moving instead of a stationary source, so that it better represents the true recording geometry. Note this processing sequence requires only a trivial modification of the time- and frequency-domain FWI algorithms discussed supra.

One or more of the low-frequency sources may also step or otherwise alternate between two or more frequencies. The sources may also periodically adjust the amplitude of the emitted waves down to zero amplitude and cease emitting sound, and then increase the amplitude either back up to its maximum amplitude at the same frequency as before or at a different frequency, as needed for the next "shot point". Each source will likely follow its own schedule as needed to optimally provide adequate sampling and total emitted energy for its frequency range. There is no particular reason why the "shot points" at different frequencies should coincide, although in some embodiments they may.

A broadband seismic source should be understood to be one that is designed to produce usable seismic energy over a relatively broad range of frequencies (more than 2 octaves). For example, a typical conventional seismic source in current use might emit effective amounts of energy over a frequency in the range of about 5 to about 80 Hz (i.e., about 4 octaves). Thus, a conventional seismic survey would be a "broadband" survey for purposes of the instant disclosure.

On the other hand, a narrowband seismic source should be understood to be one that does not cover a broad range of frequencies, e.g., two octaves or less. For example, at frequencies around 1 Hz, 2 octaves would cover a frequency range from 1-4 Hz. A narrowband source might be so-called because its range of frequencies with usable energy is much smaller than for a typical broadband source, for example, a frequency in the range of 1 to about 4 Hz, or 1 to about 2 Hz (1 octave), etc. However, a narrowband source might be one where only a limited number of narrow frequency ranges are emitted by the source. For example, a source rich in harmonics that produces very narrow bands centered around 2, 4, 8, 16, 32 and 64 Hz, but with very little energy at frequencies in between, would be considered to be a narrowband source. Thus, a narrow band seismic source may emit a wave having a low discrete frequency that falls within a narrow frequency band 2+/−0.1 Hz, together with its harmonics which are also of narrow bandwidth, such that the cumulative bandwidth of the low frequency wave and its harmonics is narrow (e.g., less than a few Hz). For purposes of the instant disclosure the term "narrowband source" should be interpreted to mean at least the sorts of seismic sources listed above, whether such source(s) are disposed on land or in a marine environment and whether tunable, customizable, modifiable or not (e.g., a non-tunable narrowband source could be one that has been specifically designed and built for the purposes of emitting a particular narrowband seismic signal). A "narrowband seismic survey" will be a seismic survey that has been conducted using one or more narrowband sources.

It should be noted that although the instant disclosure has spoken of "near-monochromatic", "monochromatic," "single frequency" and/or "discrete frequency" acoustic sources, those terms should be construed to include various instances where the source substantially emits at a single frequency, without taking into account harmonics. Further, when a seismic survey is described as being "monochromatic" that term should be understood to mean that a survey was collected where the source(s) operated at one or a plurality of discrete frequencies. Thus, a narrowband source includes a discrete frequency source as a special case.

It should further be noted that although the instant invention has been discussed principally in terms of frequency-domain full waveform inversion, the instant disclosure would apply similarly to the time-domain version of this processing method. The relationship between frequency and time in seismic data is well known and those of ordinary skill in the art will recognize that converting between such domains is routinely done.

As has been mentioned previously, in some instances the seismic signals from the narrowband survey could be combined with data from a conventional seismic survey at the same or a proximate location to produce an enhanced survey that has broader bandwidth than would be possible with a conventional survey only. This combination might be done in many ways. For example, it is well known to those of ordinary skill in the art how to combine seismic traces (or lines, volumes, etc.) from two different conventional seismic surveys into a single survey. Where the shot and receiver locations are coincident (or nearly so), simple stacking (adding together) the corresponding traces might be used, perhaps with amplitude balancing or trace weighting being used to make the amplitudes on the different traces comparable. In other instances, frequency-domain balancing before summing might be useful. In instances where the receiver locations differ, interpolation and/or extrapolation might be used to create data sets that can be more easily combined. These are some of the many means by which two seismic traces with different amplitudes and frequency content and, potentially acquired at slightly different locations might be combined. Those of ordinary skill in the art will readily be able to devise other approaches.

Further, in some instances the narrowband survey will have utility that is separate and apart from any broadband seismic survey. For example, in some embodiments a plurality of monochromatic sources will be used to collect a narrowband survey. That narrowband seismic data set will then be submitted to an FWI algorithm that, in some embodiments, operates frequency-by-frequency to calculate an inverse. The resulting inversion can then subsequently be used in seismic exploration.

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, VSP data, full-waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example, filtered data traces, etc. In short, the process disclosed herein can potentially be applied to a wide variety of types of geophysical time series, but it may be applied to a collection of spatially related time series.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:
1. A method of seismic exploration above a region of the subsurface containing structural or stratigraphic features conducive to the presence, migration, or accumulation of hydrocarbons, comprising the steps of:
 (a) conducting a narrowband seismic survey proximate to the region of the subsurface using at least one narrowband seismic source for at least one low frequency narrowband frequency range less than 8 Hz, thereby creating a narrowband seismic survey;
 (b) accessing a broadband seismic survey that was acquired proximate to said narrowband seismic survey;
 (c) recording at least one emitted wavefield from one of said at least one narrowband seismic source;
 (d) performing an algorithm using seismic data from said narrowband seismic survey, thereby producing an improved velocity model of the region of the subsurface, wherein said narrowband seismic survey, said broadband seismic survey, and said at least one recorded emitted wavefield are used to calculate a full waveform inversion over a plurality of different frequencies, wherein data corresponding to at least one of said plurality of different frequencies is obtained from said narrowband seismic survey and data corresponding to at least one of said plurality of different frequencies is obtained from said broadband survey, and wherein said at least one emitted wavefield is used as input to said modeling portion of said full waveform inversion; and
 (e) using seismic data from said broadband seismic survey and said improved velocity model to perform seismic imaging, thereby producing a migrated image.

2. The method of seismic exploration according to claim 1, further comprising using at least a portion of said migrated image to explore for hydrocarbons within said region of the subsurface.

3. The method of seismic exploration according to claim 1, wherein at least one of said at least one narrowband seismic source is a monochromatic seismic source.

4. The method of seismic exploration according to claim 1, wherein at least one of said at least one narrowband seismic source is a tunable seismic source.

5. The method of seismic exploration according to claim 1, wherein said narrowband seismic survey and said broadband seismic survey are obtained concurrently.

6. The method of seismic exploration according to claim 1, wherein said narrowband frequency range covers a frequency range no more than two octaves.

7. The method of seismic exploration according to claim 1, wherein performing said algorithm using seismic data from said narrowband seismic survey further comprises performing a frequency domain algorithm using seismic data from said narrowband seismic survey.

8. A method of seismic exploration above a region of the subsurface containing structural or stratigraphic features conducive to the presence, migration, or accumulation of hydrocarbons, comprising the steps of:
(a) conducting a narrowband seismic survey proximate to the region of the subsurface using at least one low frequency monochromatic seismic source for at least one discrete frequency, said at least one discrete frequency being less than 8 Hz, thereby creating a narrowband seismic survey;
(b) accessing a broadband seismic survey that was acquired proximate to said narrowband seismic survey;
(c) recording at least one emitted wavefield from one of said at least one low frequency monochromatic seismic source;
(d) performing an algorithm using seismic data from said narrowband seismic survey, thereby producing an improved velocity model of the region of the subsurface, wherein said narrowband seismic survey, said broadband seismic survey, and said at least one recorded emitted wavefield are used to calculate a full waveform inversion over a plurality of different frequencies, wherein data corresponding to at least one of said plurality of different frequencies is obtained from said narrowband seismic survey and data corresponding to at least one of said plurality of different frequencies is obtained from said broadband survey, and wherein said at least one emitted wavefield is used as input to said modeling portion of said full waveform inversion; and
(e) using seismic data from said broadband seismic survey and said improved velocity model to perform seismic imaging, thereby producing a migrated image.

9. The method of seismic exploration according to claim 8, wherein at least one of said at least one low frequency monochromatic seismic source is a tunable seismic source.

10. The method of seismic exploration according to claim 8, wherein said narrowband seismic survey and said broadband seismic survey are obtained concurrently.

11. The method of seismic exploration according to claim 8, wherein performing said algorithm using seismic data from said narrowband seismic survey further comprises performing a frequency domain algorithm using seismic data from said narrowband seismic survey.

12. A method of seismic exploration above a region of the subsurface containing structural or stratigraphic features conducive to the presence, migration, or accumulation of hydrocarbons, comprising the steps of:
(a) accessing a seismic data set obtained according to the steps of:
(1) conducting a narrowband seismic survey proximate to the region of the subsurface using at least one low frequency narrowband seismic source for at least one low frequency narrowband frequency range less than 8 Hz, thereby creating a narrowband seismic survey;
(2) accessing a broadband seismic survey that was acquired proximate to said narrowband seismic survey;
(3) recording at least one emitted wavefield from one of said at least one low frequency narrowband seismic source;
(4) performing an algorithm using seismic data from said narrowband seismic survey, thereby producing an improved velocity model of the region of the subsurface, wherein said narrowband seismic survey, said broadband seismic survey, and said at least one recorded emitted wavefield are used to calculate a full waveform inversion over a plurality of different frequencies, wherein data corresponding to at least one of said plurality of different frequencies is obtained from said narrowband seismic survey and data corresponding to at least one of said plurality of different frequencies is obtained from said broadband survey, and wherein said at least one emitted wavefield is used as input to said modeling portion of said full waveform inversion; and
(5) using seismic data from said broadband seismic survey and said improved velocity model to perform seismic imaging, thereby producing a migrated image;
(b) using at least a portion of said accessed seismic data set to explore for hydrocarbons within the region of the subsurface containing structural or stratigraphic features conducive to the presence, migration, or accumulation of hydrocarbons.

13. The method of seismic exploration according to claim 12, wherein said full waveform inversion data set is a frequency-domain full waveform inversion data set.

14. The method of seismic exploration according to claim 12, wherein said full waveform inversion data set is a time-domain full waveform inversion data set.

15. The method of seismic exploration according to claim 12, wherein said narrowband seismic survey and said broadband seismic survey are obtained concurrently.

16. The method of seismic exploration of seismic exploration according to claim 12, wherein said narrowband frequency range covers a frequency range no more than two octaves.

17. A method of seismic exploration above a region of the subsurface containing structural or stratigraphic features conducive to the presence, migration, or accumulation of hydrocarbons, comprising the steps of:
(a) conducting a broadband seismic survey above at least a portion of the region of the subsurface, thereby acquiring a plurality of broadband seismic traces;
(b) accessing a plurality of narrow band seismic traces from a narrowband seismic survey proximate to the region of the subsurface, said narrowband seismic survey acquired using at least one narrowband seismic source for at least one discrete frequency, said at least one discrete frequency usable by a frequency domain algorithm;

(c) recording at least one emitted wavefield from one of said at least one narrowband seismic source;

(d) acquiring a seismic image by performing the frequency domain algorithm over a plurality of frequencies, wherein data corresponding to at least one low frequency of said plurality of frequencies is obtained from said narrowband seismic traces and wherein data corresponding to at least one of said plurality of frequencies is obtained from said broadband seismic traces, wherein said narrowband seismic survey, said broadband seismic survey, and said at least one recorded emitted wavefield are used to calculate a full waveform inversion over a plurality of different frequencies, wherein data corresponding to at least one of said plurality of different frequencies is obtained from said narrowband seismic survey and data corresponding to at least one of said plurality of different frequencies is obtained from said broadband survey, and wherein said at least one emitted wavefield is used as input to said modeling portion of said full waveform inversion.

18. The method of seismic exploration according to claim 17, wherein acquiring a seismic image by performing the frequency domain algorithm over a plurality of frequencies further comprises acquiring a seismic image by performing a full waveform inversion algorithm.

19. The method of seismic exploration according to claim 17, wherein said at least one narrowband seismic source is a near-monochromatic narrowband low-frequency source that emits energy at a frequency no more than 8 Hz for the narrowband seismic survey accessed in (b).

* * * * *